(12) United States Patent
Woodling et al.

(10) Patent No.: US 10,476,129 B2
(45) Date of Patent: Nov. 12, 2019

(54) ROTATABLE ANTENNA MOUNT

(71) Applicant: VOXX International Corporation, Hauppauge, NY (US)

(72) Inventors: Yiqi W. Woodling, Carmel, IN (US); Adam D. Smith, Indianapolis, IN (US)

(73) Assignee: VOXX International Corporation, Hauppauge, NY (US)

( * ) Notice: Subject to any disclaimer, the term of this patent is extended or adjusted under 35 U.S.C. 154(b) by 0 days.

(21) Appl. No.: 15/833,464

(22) Filed: Dec. 6, 2017

(65) Prior Publication Data

US 2018/0159201 A1    Jun. 7, 2018

Related U.S. Application Data

(60) Provisional application No. 62/431,184, filed on Dec. 7, 2016.

(51) Int. Cl.
*H01Q 1/12* (2006.01)
*F16M 11/12* (2006.01)
(Continued)

(52) U.S. Cl.
CPC ........... *H01Q 1/1228* (2013.01); *F16M 11/12* (2013.01); *F16M 13/022* (2013.01); *H01Q 3/04* (2013.01); *F16B 2/005* (2013.01); *F16B 2/065* (2013.01)

(58) Field of Classification Search
CPC ...... H01Q 1/1228; H01Q 3/04; H01Q 1/1221; H01Q 1/125; F16M 11/12; F16M 11/121;
(Continued)

(56) References Cited

U.S. PATENT DOCUMENTS

| 646,835 | A | * | 4/1900 | Jackson | ................. | A47B 23/02 |
| | | | | | | 248/231.71 |
| 1,963,463 | A | * | 6/1934 | Hammer | ................. | A01K 97/10 |
| | | | | | | 114/364 |

(Continued)

OTHER PUBLICATIONS

The Notification of Transmittal of the International Search Report and the Written Opinion of the International Searching Authority, or the Declaration, in English, dated Apr. 24, 2018, which was issued by the International Searching Authority of WIPO in Applicant's corresponding international PCT application having Serial No. PCT/US2017/064912, filed on Dec. 6, 2017.

(Continued)

*Primary Examiner* — Ingrid M Weinhold
(74) *Attorney, Agent, or Firm* — Bodner & O'Rourke, LLP; Gerald T. Bodner; Christian P. Bodner

(57) ABSTRACT

A rotatable antenna mount for mounting an antenna to a structure includes a mounting bracket, an antenna rotation assembly and an antenna mounting pole. The mounting bracket includes a base and two sidewalls that together define an opening into which the structure is received. An adjustment clamp is inserted through one of the sidewalls of the base and mounts the mounting bracket to the structure situated within the space. The antenna mounting pole is mounted to the rotation assembly. The antenna rotation assembly is situated on the mounting bracket and includes at least two rotation brackets that are hingedly joined to one another so that the antenna mounting pole to which an antenna is mounted may be selectively moved in at least two dimensions.

15 Claims, 9 Drawing Sheets

US 10,476,129 B2

Page 2

(51) Int. Cl.
*H01Q 3/04* (2006.01)
*F16M 13/02* (2006.01)
*F16B 2/00* (2006.01)
*F16B 2/06* (2006.01)

(58) Field of Classification Search
CPC ............... F16M 11/02; F16M 11/2057; F16M 11/2064; F16M 11/2071; F16M 11/2028; F16B 2/005; F16B 2/065; Y10T 403/32008; Y10T 403/32049; Y10T 403/32541; Y10T 16/53822; Y10T 16/53828; Y10T 16/53845; Y10T 16/53883
USPC ........... 248/231.71, 278.1, 515, 534, 229.15, 248/229.25, 228.6, 230.6, 282.1, 284.1; 343/882; 403/53, 58, 72–74
See application file for complete search history.

(56) References Cited

U.S. PATENT DOCUMENTS

| | | | | |
|---|---|---|---|---|
| 2,092,426 A * | 9/1937 | Riddell | A47K 3/38 | 160/327 |
| 2,371,903 A * | 3/1945 | Maier | F21V 21/088 | 248/231.85 |
| 2,540,584 A * | 2/1951 | Jaycox | A01K 97/10 | 224/922 |
| 2,599,160 A * | 6/1952 | Brauer | A01K 97/10 | 248/515 |
| 2,628,796 A * | 2/1953 | Krizman | H01Q 1/1221 | 248/237 |
| 2,645,439 A * | 7/1953 | Gauthier | A01K 97/10 | 248/507 |
| 2,687,863 A * | 8/1954 | Vogt | H01Q 1/1221 | 248/284.1 |
| 2,837,304 A * | 6/1958 | Goss, Sr. | H01Q 1/1221 | 248/148 |
| 2,846,896 A * | 8/1958 | Hartley | B63H 21/265 | 114/172 |
| 2,961,209 A * | 11/1960 | Willey | A01K 97/10 | 248/515 |
| 3,014,679 A * | 12/1961 | Jepson | A01K 97/11 | 248/278.1 |
| 3,424,419 A * | 1/1969 | Siegel | A45D 44/14 | 223/66 |
| 3,601,919 A * | 8/1971 | Nixon | A01K 97/10 | 248/291.1 |
| 3,845,928 A * | 11/1974 | Barrett | G10K 11/004 | 248/292.13 |
| 3,934,801 A * | 1/1976 | Johnson | A01K 97/10 | 248/515 |
| 4,143,869 A | 3/1979 | Paterson et al. | | 296/166 |
| 4,183,490 A * | 1/1980 | Montanarini | H01Q 1/084 | 248/292.13 |
| 4,709,891 A * | 12/1987 | Barnett | G09F 7/18 | 248/214 |
| 5,109,411 A * | 4/1992 | O'Connell | B60R 11/0241 | 224/553 |
| 5,285,938 A * | 2/1994 | Fauchald | B60R 11/0241 | 224/482 |
| 5,431,364 A * | 7/1995 | Etter | A45B 11/00 | 135/16 |
| D370,336 S * | 6/1996 | Rosier | | D3/5 |
| 5,941,497 A * | 8/1999 | Inoue | H01Q 1/125 | 248/291.1 |
| 5,982,340 A * | 11/1999 | Troche | H01Q 1/1214 | 343/882 |
| 6,264,152 B1 * | 7/2001 | Bloch | F16M 11/126 | 248/274.1 |
| 6,466,181 B1 * | 10/2002 | Ho | H01Q 1/1207 | 343/765 |
| 6,709,184 B1 * | 3/2004 | McDonald | F16M 11/06 | 248/222.51 |
| 7,264,212 B2 * | 9/2007 | Hung | F16M 11/10 | 248/184.1 |
| 7,408,526 B2 * | 8/2008 | Pan | H01Q 1/125 | 343/880 |
| 7,675,476 B2 * | 3/2010 | Wang | H01Q 1/125 | 343/702 |
| 7,737,900 B1 * | 6/2010 | Saindon | H01Q 3/08 | 343/757 |
| 7,861,998 B2 * | 1/2011 | Huang | F16M 11/105 | 248/125.1 |
| 7,954,777 B2 * | 6/2011 | Bohm | F16M 11/10 | 248/274.1 |
| 8,020,823 B2 * | 9/2011 | Wang | F16M 11/12 | 248/278.1 |
| 8,196,883 B2 * | 6/2012 | Hirschhorn | F16M 11/041 | 248/274.1 |
| 8,339,329 B2 | 12/2012 | Shen | | 343/882 |
| 8,627,990 B2 * | 1/2014 | Nakajima | B62J 9/008 | 224/420 |
| 9,622,292 B1 * | 4/2017 | Burrell | H01Q 1/125 | |
| 2001/0015707 A1 | 8/2001 | Oby | | 343/890 |
| 2002/0084396 A1 | 7/2002 | Weaver | | 248/278.1 |
| 2004/0135047 A1 | 7/2004 | Hunt | | 248/229.14 |
| 2005/0278851 A1 | 12/2005 | DeMayo | | 5/624 |
| 2007/0136995 A1 * | 6/2007 | Hu | F16M 11/10 | 16/340 |
| 2007/0241244 A1 * | 10/2007 | Tavassoli Hozouri | F16M 11/105 | 248/183.1 |
| 2007/0262210 A1 * | 11/2007 | Oh | F16M 11/105 | 248/125.1 |
| 2008/0038050 A1 * | 2/2008 | Chen | F16M 11/105 | 403/62 |
| 2008/0165076 A1 * | 7/2008 | Pan | H01Q 1/125 | 343/882 |
| 2008/0277551 A1 * | 11/2008 | Hackney | E04B 1/2604 | 248/276.1 |
| 2008/0278403 A1 * | 11/2008 | Wang | H01Q 1/125 | 343/882 |
| 2009/0002261 A1 * | 1/2009 | Bohm | F16M 11/10 | 343/882 |
| 2009/0194649 A1 * | 8/2009 | Huang | F16M 11/105 | 248/183.3 |
| 2012/0138754 A1 * | 6/2012 | Lim | F16M 11/04 | 248/74.1 |
| 2012/0187261 A1 * | 7/2012 | Cicero | B63B 17/00 | 248/201 |
| 2016/0312943 A1 * | 10/2016 | Yang | F16M 11/18 | |

OTHER PUBLICATIONS

The International Search Report, in English, dated Apr. 24, 2018, which was issued by the International Searching Authority of WIPO in Applicant's corresponding international PCT application having Serial No. PCT/US2017/064912, filed on Dec. 6, 2017.

The Written Opinion of the International Searching Authority, in English, dated Apr. 24, 2018, which was issued by the International Bureau of WIPO in Applicant's corresponding international PCT application having Serial No. PCT/US2017/064912, filed on Dec. 6, 2017.

* cited by examiner

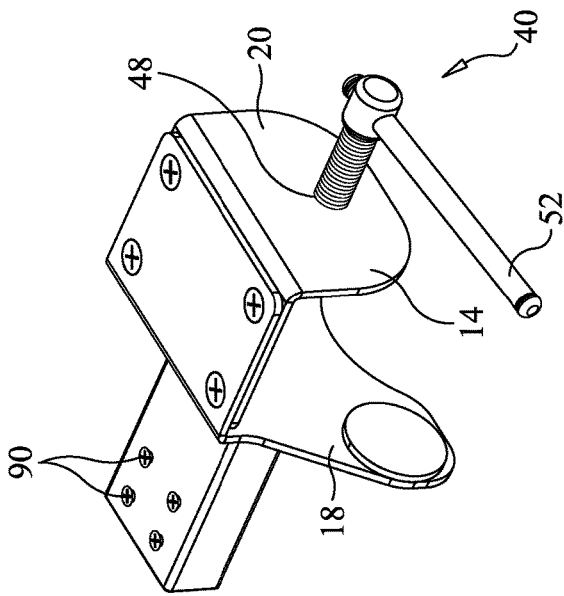
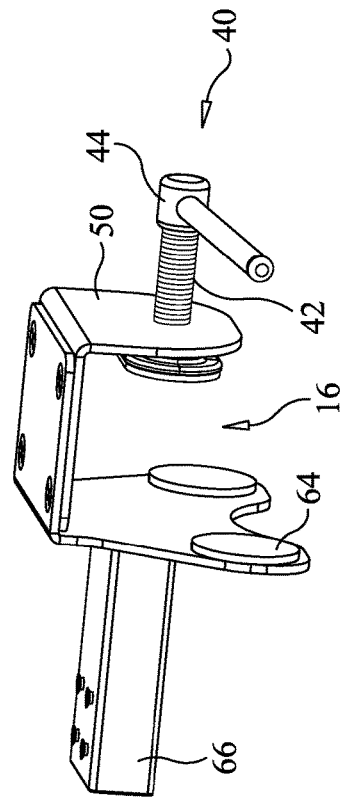
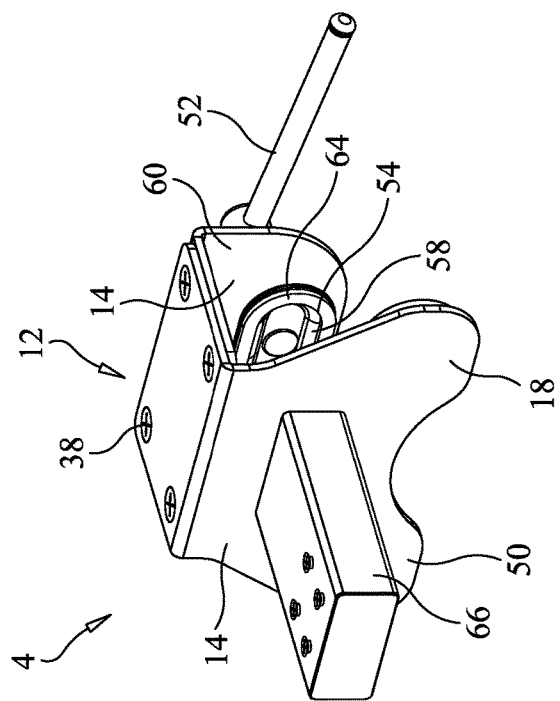
FIG. 3A
FIG. 3B
FIG. 3C

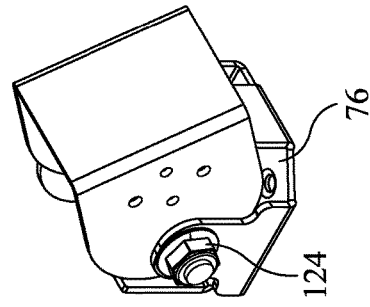
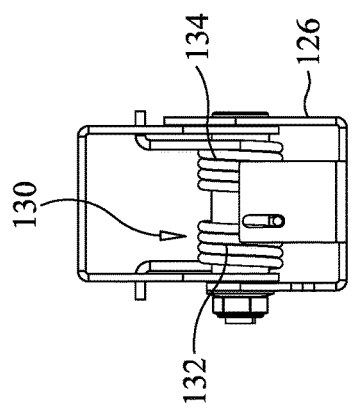
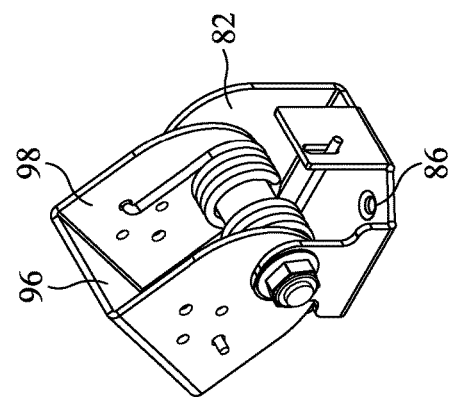
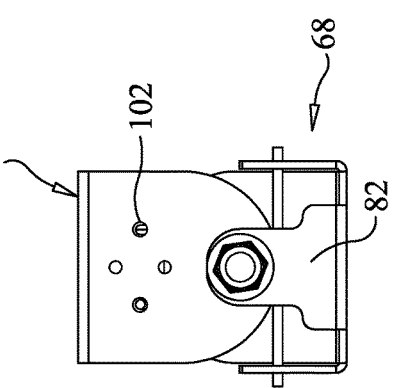
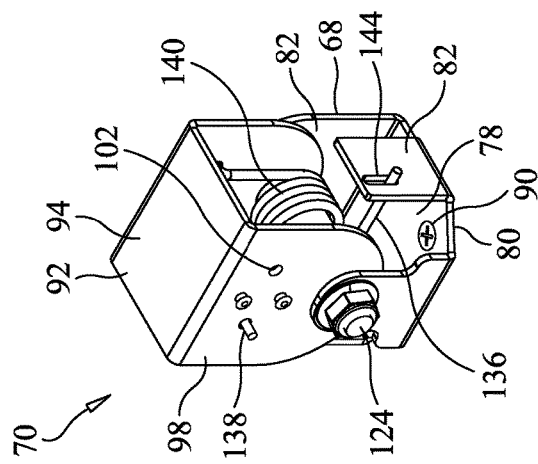

ROTATABLE ANTENNA MOUNT

CROSS-REFERENCE TO RELATED APPLICATIONS

This application is related to U.S. Provisional Patent Application Ser. No. 62/431,184, filed on Dec. 7, 2016, and entitled "Rotatable Antenna Mount", the disclosure of which is hereby incorporated by reference and on which priority is hereby claimed.

BACKGROUND OF THE INVENTION

Field of the Invention

The present invention relates to antenna mounting brackets and particularly relates to rotatable antenna mounts.

Description of the Prior Art

Consumer television antennas which are mounted inside or outside of a home often require tuning for optimal signal reception. To accomplish this, the antenna is situated on a mounting bracket that is screwed into the ceiling frame of the home or into a wall. The antenna is tuned by physically manipulating the position, orientation and angle of the antenna until optimal signal reception is achieved. Once the antenna has been tuned, its orientation, position and angle are locked with respect to the mounting bracket with bolts and/or screws. However, it is often difficult to maintain the position, orientation and angle of the antenna while it is being locked in place on the mounting bracket. Furthermore, if the position of the mounting bracket on the frame or structure requires adjustment, additional holes are created in the mounting structure due to the screws joining the bracket thereto.

The present invention eliminates the need to drill/screw the mounting bracket into the frame or structure and provides a mechanism that allows the antenna to be easily tuned and locked in place.

OBJECTS AND SUMMARY OF THE INVENTION

It is an object of the present invention to provide an antenna mount for consumer television antennas that is easily adjustable by a user to selectively tune the antenna in at least two dimensions.

It is another object of present invention to provide an antenna mount for consumer television antennas that is easily mountable to and adjustable on a frame or structure.

It is a further object of the present invention to provide an antenna mount for consumer television antennas that allows a user to mount the antenna to a frame or structure without screws or drilling.

In accordance with one form of the present invention, a rotatable antenna mount for consumer television antennas may be selectively mounted to a ceiling frame member within a residence, for example, an exposed joist or truss in an attic. The rotatable antenna mount includes a mounting bracket and an antenna rotation assembly extending therefrom. The ceiling frame member is received within the mounting bracket and secured therein by a screw clamp adjuster that extends transversely through the mounting bracket. The antenna rotation assembly includes a plurality of rotator brackets interposed between an antenna mounting pole to which the antenna is affixed and the mounting bracket so that the antenna may be selectively tuned by a user in two or three dimensions.

The antenna rotation assembly also includes a spring assembly that at least partially compensates for the weight of the antenna and biases the antenna towards a particular orientation. The force exerted by the spring assembly allows the orientation of the antenna to be easily fixed without the need of tools once optimal signal reception has been achieved by selectively tuning the antenna.

These and other objects, features and advantages of the present invention will be apparent from the following detailed description of illustrative embodiments thereof, which is to be read in connection with the accompanying drawings.

BRIEF DESCRIPTION OF THE DRAWINGS

FIGS. 3A-3C are perspective views of the mounting bracket of the rotatable antenna mount formed in accordance with the present invention.

FIGS. 4A-4E are perspective (FIGS. 4A-4C), front (FIG. 4D) and side (FIG. 4E) views of the rotator assembly of the rotatable antenna mount formed in accordance with the present invention, showing the first and second rotator brackets in various orientations.

DETAILED DESCRIPTION OF THE PREFERRED EMBODIMENTS

Figure 1:
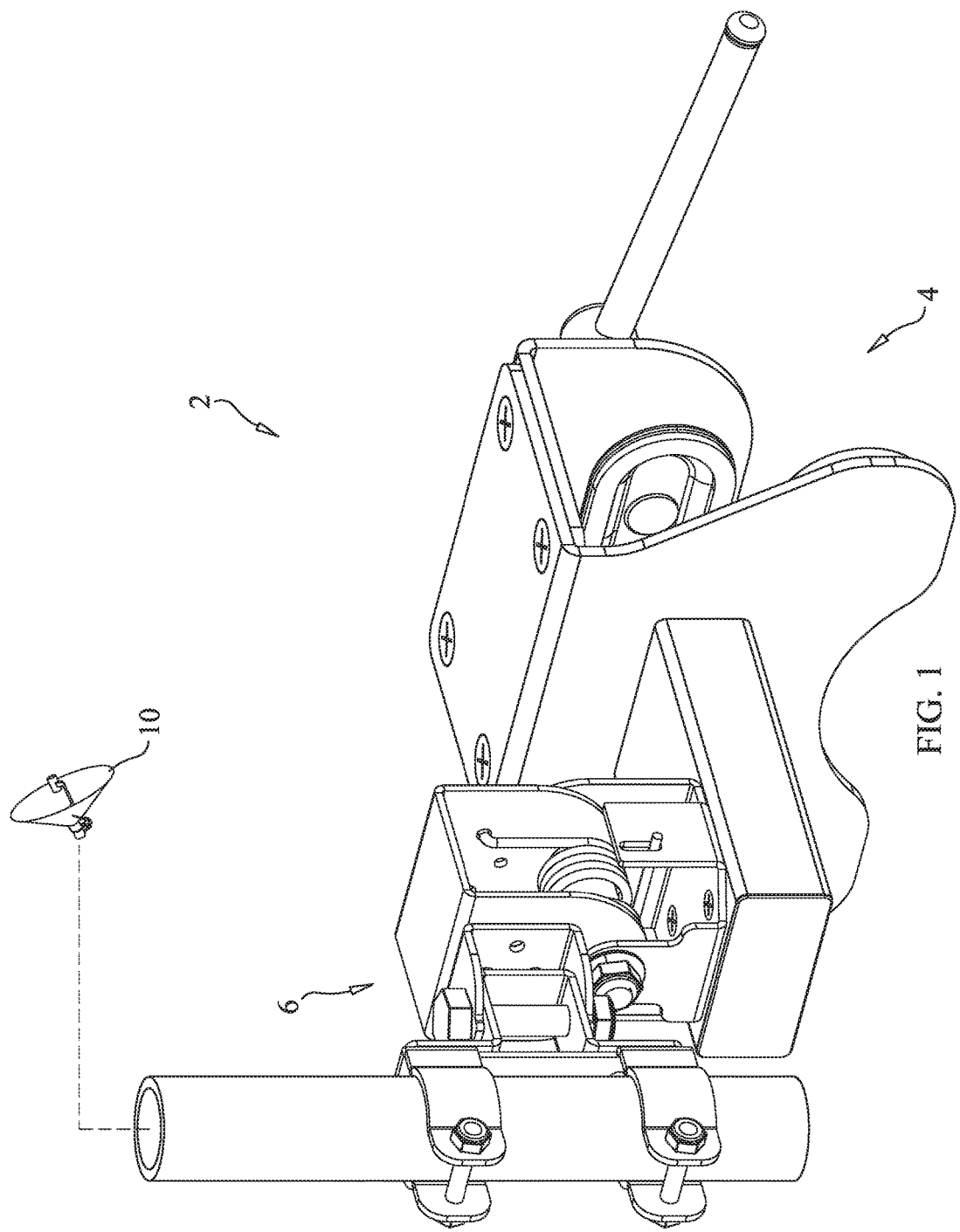
FIG. 1 is a perspective view of a rotatable antenna mount constructed in accordance with the present invention for mounting on a frame or structure.
Figure 2:
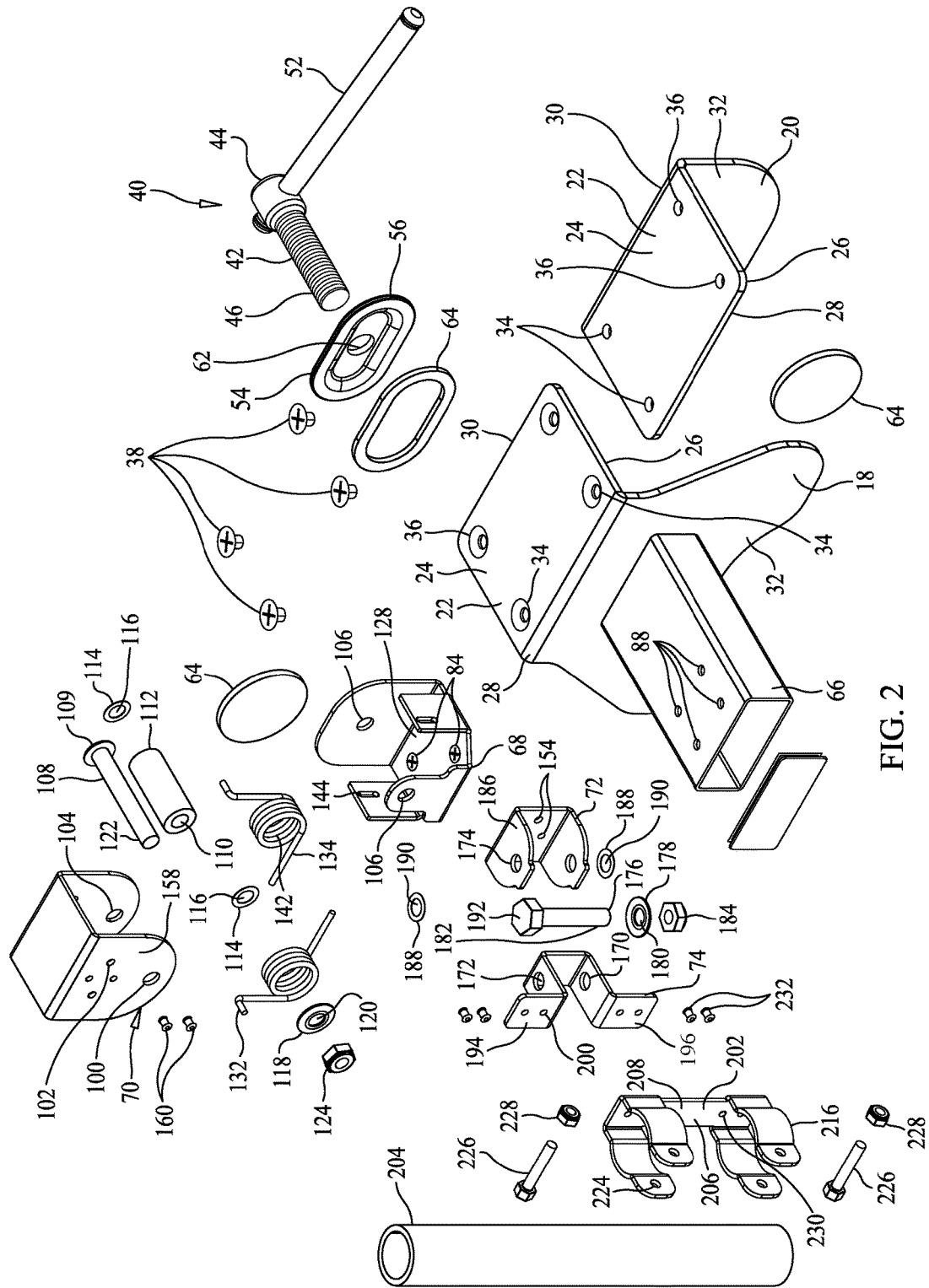
FIG. 2 is an exploded, perspective view of the rotatable antenna mount constructed in accordance with the present invention.

Referring initially to FIGS. 1-3 of the drawings, it will be seen that a rotatable antenna mount 2 constructed in accordance with the present invention basically includes two main components: a mounting bracket 4 and an antenna rotation assembly 6 mounted thereto. The mounting bracket 4 can be affixed to an indoor structure, such as the ceiling frame 8 (e.g., a joist, stud or truss member) in the attic of a home, or to an outdoor structure, such as fence (not shown). The antenna rotation assembly 6 is selectively rotatable in at least two dimensions so that an antenna 10 mounted thereto may be tuned for optimal signal reception/transmission. Various types of antennas 10 (e.g., outdoor, indoor, omni-directional and directional) may be situated on the antenna rotation assembly 6 depending on the particular application and location of the antenna mount 2.

As can be seen in FIG. 3 (i.e., FIGS. 3A-3C) of the drawings, the mounting bracket 4 includes a base 12 and preferably two sidewalls 14 extending perpendicularly outwardly therefrom, the sidewalls being situated opposite and parallel to each other. The sidewalls 14 and the base 12 together define a U-shaped space 16 for receiving at least a portion of the frame 8 or other structure (see FIG. 6). In accordance with a preferred embodiment of the present invention, the mounting bracket 4 is formed of a pair of parallel opposed L-shaped brackets, specifically, a first bracket 18 and a second bracket 20. As can be seen in FIGS. 1-3 of the drawings, the first L-shaped bracket 18 and the second L-shaped bracket 20 are engageable with each other and together form the mounting bracket 4.

More specifically, and as shown FIG. 2, the first L-shaped bracket 18 and the second L-shaped bracket 20 each preferably include a base 22 that has a top side 24 and an opposite bottom side 26, a first lateral edge 28 and an opposite second lateral edge 30. Each L-shaped bracket 18, 20 further includes at least one sidewall 32 extending perpendicularly outwardly from the bottom side 26 of the base 22. The sidewall 32 of the first L-shaped bracket 18 is situated in proximity to the first lateral edge 28 thereof, and the sidewall 32 of the second L-shaped bracket 20 is situated in proximity to the second lateral edge 30 thereof. As will be described in greater detail in the forthcoming paragraphs, when the first L-shaped bracket 18 and the second L-shaped bracket 20 are engaged with one another, the sidewalls 32 and bases 22 thereof form the sidewalls 14 and base 12 of the mounting bracket 4.

Preferably, there is a group of openings 34 formed through the thickness of each L-shaped bracket's base 22. The group of openings 34 comprises four spaced apart holes 36, which may be threaded on one or both of the L-shaped brackets 18, 20. The holes 36 in the bases 22 of the L-shaped brackets 18, 20 are dimensioned and spaced apart from each other such that they are in mutual respective alignment when the bases 22 are situated on top of one another. More specifically, to form the mounting bracket 4, the L-shaped brackets 18, 20 are situated on top of one another so that the bottom side 26 of one of the bracket's base 22 is in communication with the top side 24 of the other bracket's base 22. A plurality of screws 38, bolts or other fastening means are received by the aligned holes 36 in the bases 22, joining the first L-shaped bracket 18 to the second L-shaped bracket 20 to form the mounting bracket 4.

As described in the preceding paragraphs, the frame 8 or structure is at least partially received in the U-shaped space 16 of the mounting bracket 4. A screw clamp adjuster 40 is biased against the frame 8 to secure the frame 8 within the mounting bracket 4. The screw clamp adjuster 40 preferably includes an externally threaded rod 42 having a first axial end 44 and an opposite second axial end 46. The rod 42 is threadingly received within a threaded hole 48 formed through the thickness of at least one sidewall 14 of the mounting bracket 4, the second axial end 46 of the rod 42 being situated at least partially within the U-shaped space 16 and the first axial end 44 being situated outside of the outer surface 50 of the sidewall 14. A handle 52 or knob situated on the rod 42 in proximity to the first axial end 44 thereof is selectively rotatable by a user to advance and retract the rod 42 into the U-shaped space 16. After the frame 8 has been received within the U-shaped space 16, the handle 52 is rotated to advance the rod 42 into the U-shaped space 16. As the rod 42 advances through the hole 48 in the sidewall 14, the second axial free end 46 is biased against the frame 8 to secure it within the U-shaped space 16. Preferably, the handle 52 is formed as an elongated member that extends radially outwardly from the first axial end 44 of the rod 42, as shown in FIGS. 2 and 3 of the drawings.

In a preferred embodiment of the present invention, the screw clamp adjuster 40 further includes a clamp pad 54 situated on the second axial end 46 of the rod 42. The clamp pad 54 includes a first side 56 and an opposite second side 58. The first side 56 of the clamp pad 54 faces the inner surface 60 of the sidewall 14 through which the rod 42 extends and the second side 58 faces the frame 8. An opening 62 is formed centrally through the thickness of the clamp pad 54 for receiving the second axial end 46 of the rod 42. Preferably, the opening 62 in the clamp pad 54 is formed as a threaded hole that is engaged by the external threads of the rod 42. As the handle 52 is selectively rotated to advance the rod 42 through the threaded hole 48 in the sidewall 14, the clamp pad 54 is biased against the frame 8, securing it within the mounting bracket 4. The clamp pad 54 provides a larger surface area to engage the frame than just the second axial end 46 of the rod 42 alone. Accordingly, the clamping force of the second axial end 46 of the rod 42 on the frame 8 may be spread over a larger area.

The clamp pad 54 may further include a gripping pad 64 affixed to the second side 58 thereof, the gripping pad 64 being interposed between the clamp pad 54 and the frame 8. The gripping pad 64 resists slippage between the clamp pad 54 and the frame 8, or may further be used to minimize marring of the structure on which the antenna mount 2 is mounted. At least one additional gripping pad 64 may be affixed to the inner surface 60 of the sidewall 14 opposite the sidewall 14 through which the screw clamp adjuster 40 extends to resist slippage between the opposite side of the frame 4 and the inner surface 60 of the sidewall 14 in communication therewith. The gripping pads 64 are preferably formed of rubber although they may be formed of a variety of materials including plastic and other polymers.

As can be seen in FIGS. 6-9 of the drawings, the mounting bracket 4 is situated on the frame 8 or structure so that the frame 8 is received within the U-shaped space 16 therein. The mounting bracket 4 can be secured to the frame 8 in various orientations, such as vertical, horizontal, inverted and angulated. The handle 52 of the screw clamp adjuster 40 is rotated so that the rod 42 is advanced through the sidewall 14 and clamping force is applied between the gripping pads 64 on opposite sides of the frame 8, thereby securing the mounting bracket 4 and antenna rotation assembly 6 extending therefrom to the frame 8 or structure.

The antenna rotation assembly 6 is situated on a mounting post 66 that extends perpendicularly outwardly from the outer surface 50 of one sidewall 14 of the mounting bracket 4, opposite the sidewall 14 through which the screw clamp adjuster 40 extends. The antenna rotation assembly 6 includes a first rotator bracket 68 and a second rotator bracket 70. As will be described in greater detail in the forthcoming paragraphs, the first rotator bracket 68 and the second rotator bracket 70 engage one another so that the antenna 10 may be rotated about the X-axis, such as the horizontal axis (see FIG. 6). The antenna rotation assembly 6 further includes a third rotator bracket 72 and a fourth rotator bracket 74 that engage one another so that the antenna 10 may be rotated about the Z-axis, such as the vertical axis (see FIG. 6).

As may be seen from FIG. 2 and FIG. 4 (i.e., FIGS. 4A-4E) of the drawings, the first rotator bracket 68 includes a base 76 that has a top side 78 and an opposite bottom side 80. Preferably, at least four sidewalls 82 extend perpendicularly outwardly from the base 76. The base 76 of the first rotator bracket 68 further includes a group of openings 84 formed through the thickness thereof. The group of openings 84 preferably comprises four spaced apart holes 86, which may be threaded. The holes 86 in the base 76 of the first rotator bracket 68 are dimensioned and spaced apart from each other such that they are in alignment with corresponding openings of a group of openings 88, which are preferably threaded, formed at least partially through the thickness of the mounting post 66. A plurality of screws 90, bolts or other fastening means are received by the aligned openings 84, 88 in the base 76 of the first rotator bracket 68 and mounting post 66, joining the first rotator bracket 68 to the mounting post 66.

The second rotator bracket 70 includes a base 92 having a top side 94 and an opposite bottom side 96. Preferably two sidewalls 98 extend perpendicularly outwardly from the bottom side 96 of the base 92, the sidewalls 98 being situated opposite and parallel to each other to define the second rotator bracket 70 with a generally clevis-like structure. As will be described in the forthcoming paragraphs, the sidewalls 98 are preferably spaced apart from each other so that they may be received between two opposite sidewalls 82 of the first rotator bracket 68. Alternatively, the sidewalls 98 of the second rotator bracket 70 may be spaced apart from each other so that two opposite sidewalls 82 of the first rotator bracket 68 may be received therebetween.

The sidewalls 98 of the second rotator bracket 70 each include a group of openings 100 formed through the thickness thereof. The group of openings 100 preferably includes at least one upper hole 102 and at least one lower hole 104. The lower holes 104 are situated on the sidewalls 98 such that when the second rotator bracket 70 is positioned on or within the first rotator bracket 68, the lower holes 104 are aligned with corresponding holes 106 formed in two opposite sidewalls 82 of the first rotator bracket 68. A bolt 108 or other fastening means may be inserted through the aligned holes 104, 106 to pivotally join the second rotator bracket 70 to the first rotator bracket 68. As can be seen in FIGS. 2, 4, 6 and 7 of the drawings, in a preferred form of the present invention, the bolt 108 is inserted through the central bore 110 of a spacer 112 that is situated between the sidewalls 98 of the second rotator bracket 70 and two opposite sidewalls 82 of the first rotator bracket 68. At least one spacer washer 114 having a central bore 116 is situated at each axial end of the spacer 112 and in alignment with the central bore 110 thereof. The spacer washers 114 are interposed between the spacer 112 and the sidewalls 98 of the second rotator bracket 70. A spring washer 118 having a central bore 120 is situated on the free axial end 122 of the bolt 108. A lock nut 124 is threadingly engaged with the free axial end 122 of the bolt 108, the spring washer 118 being interposed between the lock nut 124 and the outer surface 126 of the sidewall 82 of the first rotator bracket 68 through which the bolt 108 extends.

As can be seen in FIG. 4 of the drawings, when the first and second rotator brackets 68, 70 are joined together, the second rotator bracket 70 is rotatable with respect to the first rotator bracket 68 and mounting bracket 4 attached thereto. Preferably, the second rotator bracket 70 has a field of rotation of approximately 180 degrees, or more, relative to the first rotator bracket 68 so that the second rotator bracket 70 may be selectively rotated to a variety of positions between a left position (0 degrees) and a right position (180 degrees).

Figure 6:
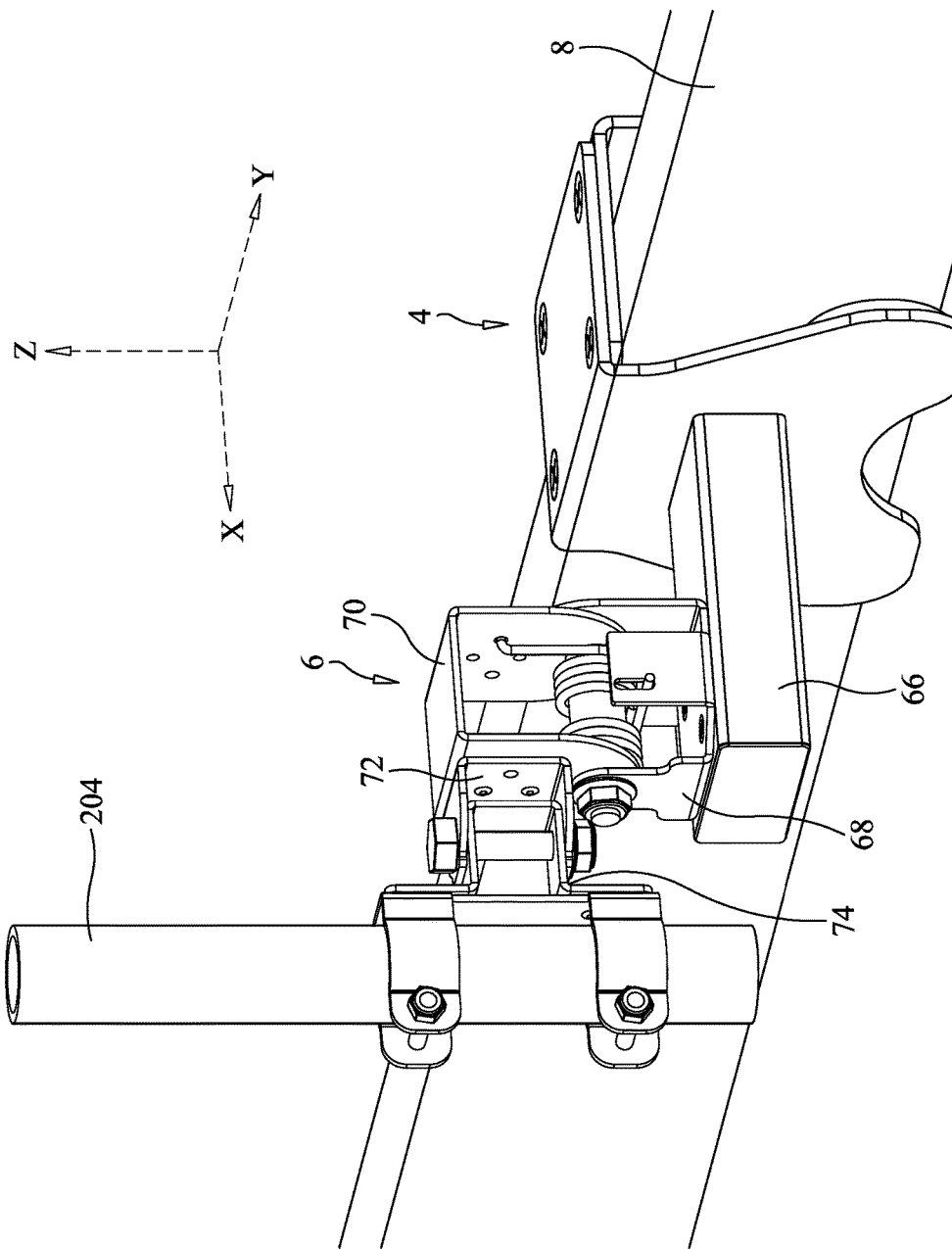
FIG. 6 is a perspective view of a rotatable antenna mount constructed in accordance with the present invention for mounting on a frame or structure, showing the mount situated in a vertical, upright orientation and mounted on a horizontal frame member.

As can be seen in FIGS. 2, 4 and 6 of the drawings, the sidewalls 82 of the first rotator bracket 68 define a space 128 therebetween wherein a spring assembly 130 is situated. As will be explained in greater detail, the spring assembly 130 biases the second rotator bracket 70 towards a neutral, vertical position, and at least partially counters the weight of the antenna 10, making the second rotator bracket 70 more easily rotatable by a user.

Figure 7:
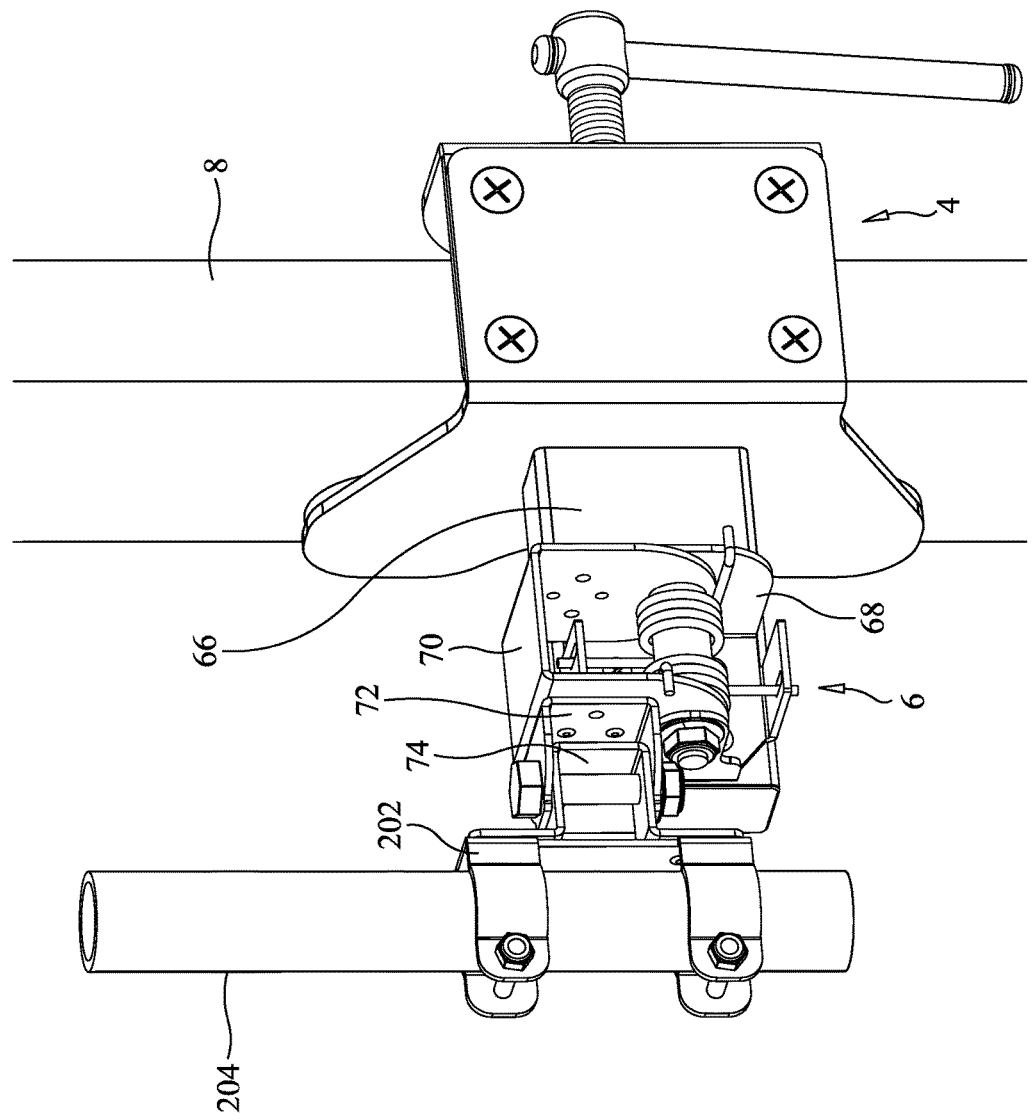
FIG. 7 is a perspective view of a rotatable antenna mount constructed in accordance with the present invention for mounting on a frame or structure, showing the mount situated in a horizontal orientation and mounted on a vertical frame member.
Figure 8:
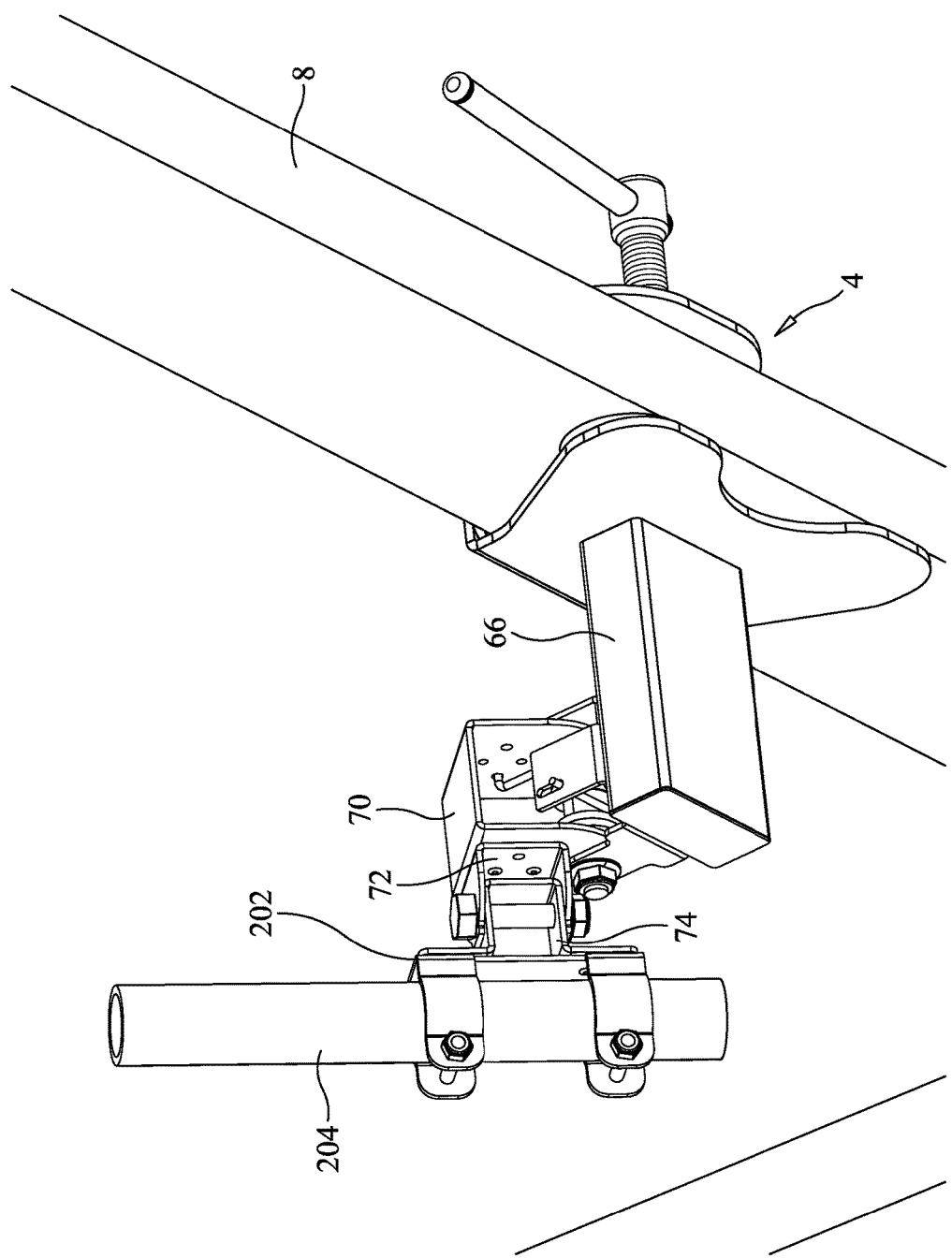
FIG. 8 is a perspective view of a rotatable antenna mount constructed in accordance with the present invention for mounting on a frame or structure, showing the mount situated in an upright, angulated orientation on an angulated frame member.
Figure 9:
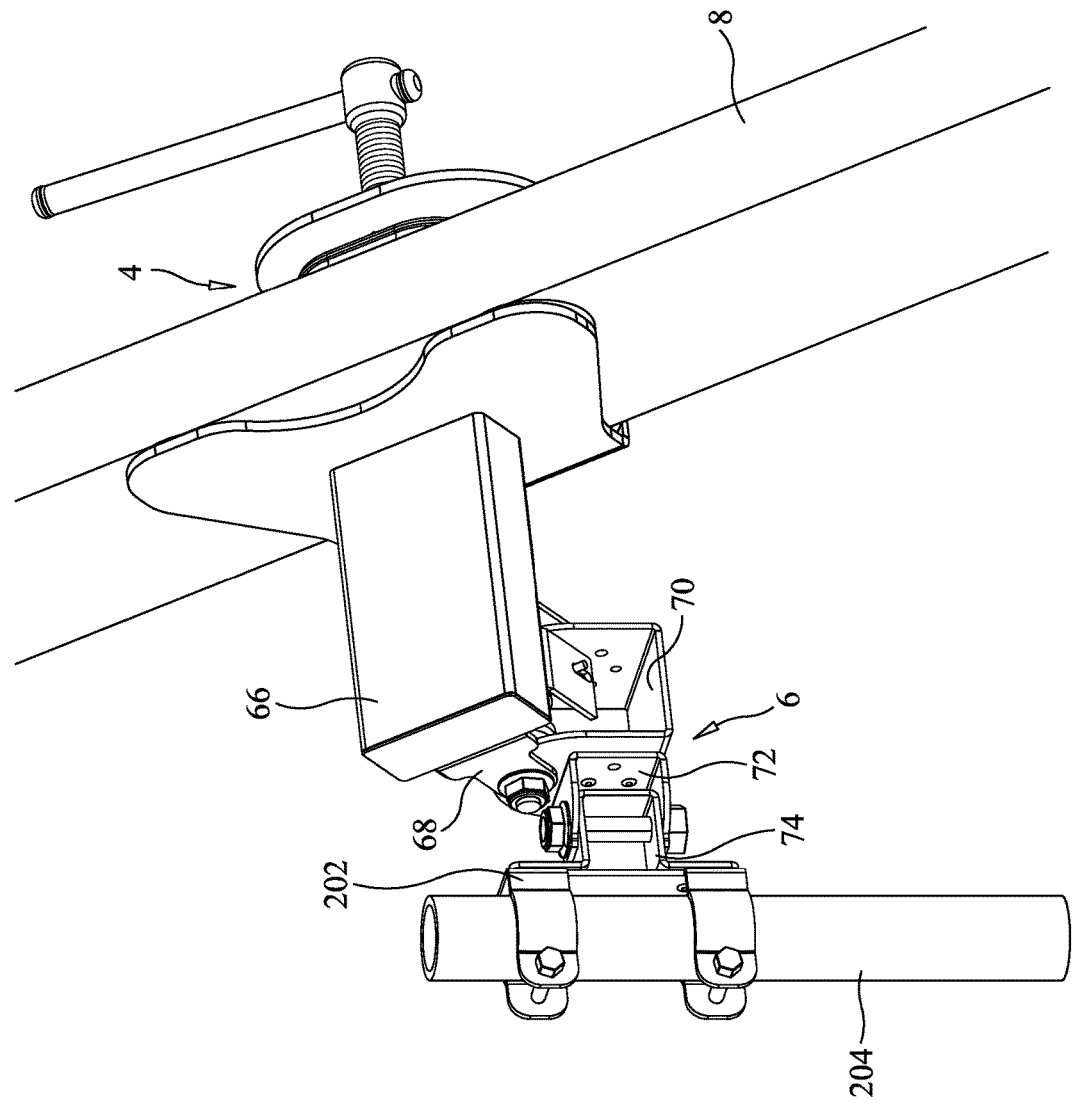
FIG. 9 is a perspective view of a rotatable antenna mount constructed in accordance with the present invention for mounting on a frame or structure, showing the mount situated in an inverted, angulated orientation on an angulated frame member.

The spring assembly 130 preferably includes a first spring 132 and a second spring 134. The first spring 132 and the second spring 134 each have a first end 136 and a second end 138 disposed opposite the first end 136, as well as a coiled portion 140 therebetween, the coiled portion 140 defining a central opening 142. The second ends 138 of the springs 132, 134 are preferably L-shaped. The first and the second springs 132, 134 are situated and oriented within the space 128 between the sidewalls 82 of the first rotator bracket 68 so that the force exerted by each spring 132, 134 is directed in opposite directions. The central openings 142 of the coiled portion 140 of each spring 132, 134 are aligned with the holes 106 in the two opposite sidewalls 82 of the first rotator bracket 68 and the lower holes 104 in sidewalls 98 of the second rotator bracket 70. As can be seen in FIGS. 4, 6 and 7 of the drawings, the spacer 112 and bolt 108 therein are inserted through the central openings 142 of the coiled portions 140 of the springs 132, 134. The L-shaped ends 138 of the springs 132, 134 are received in the upper holes 102 formed in opposite sidewalls 98 of the second rotator bracket 70. The first ends 136 of the springs 132, 134 are received in slots 144 formed in opposite sidewalls 82 of the first rotator bracket 68, the sidewalls 82 with slots 144 being adjacent to the sidewalls 82 through which the bolt 108 extends.

Figure 5C:
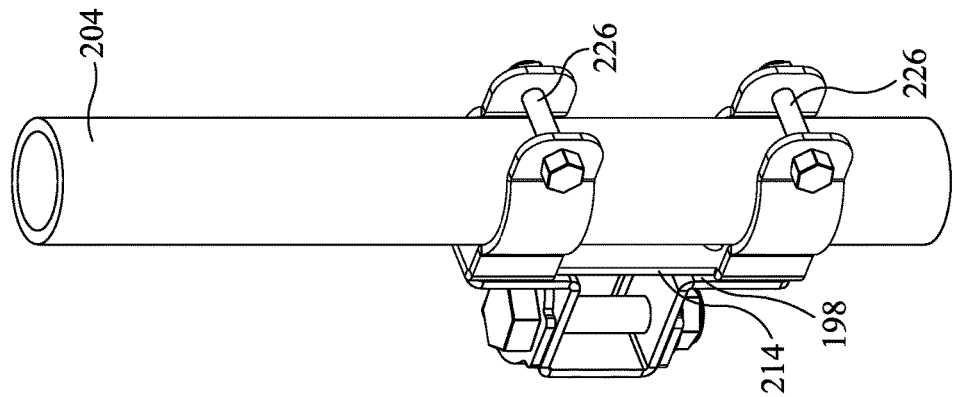
FIGS. 5A-5C are a front perspective view (FIG. 5A), rear perspective view (FIG. 5B) and side perspective view (FIG. 5C) of the rotator assembly of the rotatable antenna mount formed in accordance with the present invention, showing the third, fourth and fifth rotator brackets in various orientations.
Figure 5B:
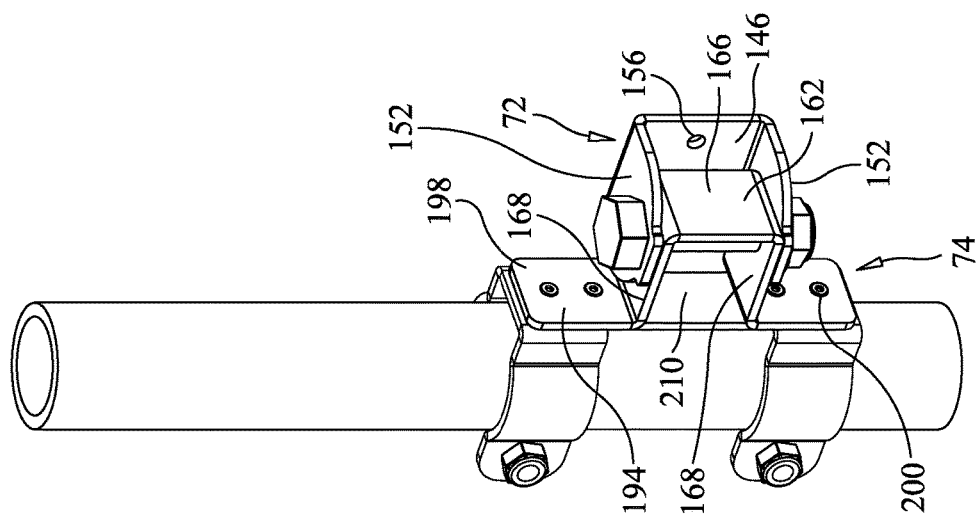
Figure 5A:
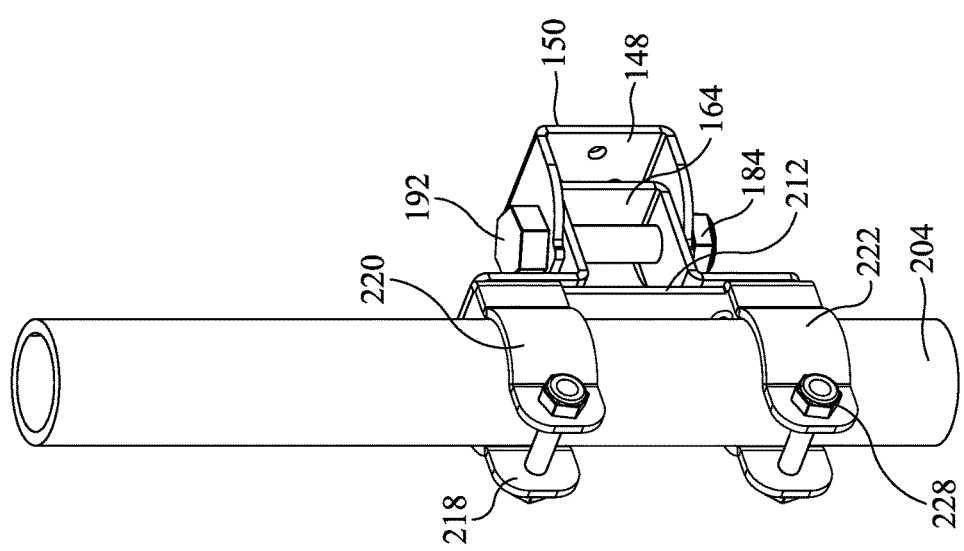

As explained in the previous paragraphs, the antenna rotation assembly 6 further includes a third rotator bracket 72 and a fourth rotator bracket 74 that engage one another to so that the antenna 10 may be rotated about the Z-axis. As shown in FIG. 2 and FIG. 5 (i.e., FIGS. 5A-5C) of the drawings, the third rotator bracket 72 includes a base 146 that has a top side 148 and an opposite bottom side 150. Preferably, at least two sidewalls 152 extend perpendicularly outwardly from the top side 148 of the base 146 to define the third rotator bracket 72 with a generally clevis-like structure. The base 146 of the third rotator bracket 72 further includes a group of openings 154 formed through the thickness thereof. The group of openings 154 preferably comprises at least two spaced apart holes 156. The holes 156 in the base 146 of the third rotator bracket 72 are dimensioned and spaced apart from each other such that they are in alignment with at least some of the upper holes 102 formed in the sidewall 98 of the second rotator bracket 70 when the bottom side 150 of the base 146 of the third rotator bracket 72 is situated on the outer surface 158 of the second rotator bracket's sidewall 98. A plurality of screws 160, bolts or other fastening means are received by the aligned holes 156, 102 in the third rotator bracket 72 and second rotator bracket 70, joining the third rotator bracket 72 thereto.

The fourth rotator bracket 74 includes a base 162 having a top side 164 and an opposite bottom side 166. Preferably two sidewalls 168 extend perpendicularly outwardly from the top side 164 of the base 162, the sidewalls 168 being situated opposite and parallel to each other. As will be described in the forthcoming paragraphs, the sidewalls 168 are preferably spaced apart from each other so that they may be received between two opposite sidewalls 152 of the third rotator bracket 72.

The sidewalls 168 of the fourth rotator bracket 74 each include at least one opening 170 formed through the thickness thereof. Preferably, the opening 170 is formed as a hole 172. The holes 172 are situated on the sidewalls 168 such that when the sidewalls 168 of the fourth rotator bracket 74 are situated between the sidewalls 152 of the third rotator bracket 72, the holes 172 are aligned with corresponding holes 174 formed in the sidewalls 152 of the third rotator bracket 72. A bolt 176 or other fastening means may be inserted through the aligned holes 172, 176 to pivotally join the fourth rotator bracket 74 to the third rotator bracket 72. A spring washer 178 having a central bore 180 is situated on the free axial end 182 of the bolt 176. A lock nut 184 is threadingly engaged with the free axial end 182 of the bolt 176, the spring washer 178 being interposed between the lock nut 184 and the outer surface 186 of the sidewall 152 of the third rotator bracket 72 through which the bolt 176 extends. At least one spacer washer 188 having a central bore 190 is preferably situated at each axial end of the bolt 176 and interposed between the sidewalls 152 of the third rotator bracket 72 and the head 192 of the bolt 176 and lock nut 184.

As can be seen in FIG. 5 of the drawings, when the third and fourth rotator brackets 72, 74 are joined together, the fourth rotator bracket 74 is rotatable with respect to the third rotator bracket 72. Preferably, the fourth rotator bracket 74 has a field of rotation of approximately 180 degrees, or more, relative to the third rotator bracket 72 so that the fourth rotator bracket 74 may be selectively rotated to a variety of positions, including between a left position (0 degrees) and a right position (180 degrees). The fourth rotator bracket 74 may be rotated to a desired position by loosening the lock nut 184 (i.e., rotated counterclockwise) which allows the fourth rotator bracket 74 to rotate with respect to the third rotator bracket 72. The lock nut 184 may be tightened (i.e., rotated clockwise) to resist movement of the fourth rotator bracket 74 with respect to the third rotator bracket 72 and situate the fourth rotator bracket 74 in a particular orientation.

The sidewalls 168 of the fourth rotator bracket 74 each further include a flange 194 extending perpendicularly outwardly from the free ends thereof. Each flange 194 includes a top surface 196, an opposite bottom surface 198 and at least one opening 200 formed through the thickness thereof. As will be explained in greater detail in the forthcoming paragraphs, a fifth rotator bracket 202 that receives an antenna mounting pole or mast 204 engages the flanges 194 of the fourth rotator bracket 74.

The fifth rotator bracket 202 includes a base 206 having a top side 208 and an opposite bottom side 210, a first lateral edge 212 and an opposite second lateral edge 214. Preferably, at least two pairs of prongs 216 extend perpendicularly outwardly from the top side 208 of the base 206. The two pairs of prongs 216 are preferably situated at opposite axial ends of the base 206. Each pair of prongs 216 preferably includes a first prong 218 and a second prong 220, the first and second prongs 218, 220 being situated at opposite lateral edges 212, 214 of the base 206 and being parallelly disposed from one another. Each prong 218, 220 further includes a concave portion 222 extending at least partially between the free axial end thereof and the base 206 of the fifth rotator bracket 202. The antenna mounting pole 204, which is generally cylindrical in shape, is positioned between the concave portions 222 of the prongs. The free axial ends of the prongs 218, 220 each include openings 224 formed through the thickness thereof, and such openings in the free axial end of the first prong 218 are positioned to be in alignment with the openings 224 in the free axial end of the second prong 220 when the first prong 218 and the second prong 220 are positioned on diametrically opposite sides of the antenna mounting pole 204. A threaded bolt 226 or screw may pass through the aligned prong openings 224 of each pair of prongs 216, and a nut 228 may be threaded onto the bolts 226 or screws to secure the first and second prong 218, 220 of each pair 216 together and to the antenna mounting pole 204 situated therebetween.

The base 206 of the fifth rotator bracket 202 further includes a plurality of openings 230 formed therethrough in proximity to the axial ends thereof. The openings 230 are dimensioned and spaced apart from each other such that they are in alignment with the openings 200 formed in the flanges 194 extending outwardly from the sidewalls 168 of the fourth rotator bracket 74 when the bottom side 210 of the base 206 of the fifth rotator bracket 202 is situated on the top surfaces 196 of the flanges 194. A plurality of screws 232, bolts or other fastening means are received by the aligned openings 230, 200 in the base 206 of the fifth rotator bracket 202 and flanges 194 of the fourth rotator bracket 74, joining the fifth rotator bracket 202 thereto.

As can be seen in FIGS. 1 and 6-9 of the drawings, the rotatable antenna mount 2 is affixed to the frame 8 at a desired location and the antenna 10 is attached to the antenna mounting pole 204. The antenna 10 may be tuned by placing it in a variety of positions within the Y-Z plane by selectively rotating the second rotator bracket 70 with respect to the first rotator bracket 68 (i.e., rotation about the X-axis). The antenna 10 may further be tuned by placing it in a variety of positions within the X-Z plane by selectively rotating the fourth rotator bracket 74 with respect to the third rotator bracket 72 (i.e., rotation about the Z-axis). Accordingly, by rotating the second rotator bracket 70 and fourth rotator bracket 74, the antenna 10 may be selectively tuned by positioning it and the mount 2 in a variety of positions within the X-Y-Z planes.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A rotatable, multi-positionable antenna mount for mounting an antenna mounted on an antenna mounting pole to a supporting structure such that the antenna is positionable in at least two dimensions, the rotatable antenna mount comprising:

a mounting bracket, the mounting bracket being mountable to the supporting structure; and an antenna rotation assembly mounted on the mounting bracket;

wherein the antenna rotation assembly is selectively rotatable in at least two dimensions and configured to selectively move the antenna mounting pole and antenna attached thereto to a desired position;

wherein the antenna rotation assembly comprises:

a first rotator bracket, a second rotator bracket, a third rotator bracket and a fourth rotator bracket;

wherein the first rotator bracket is mounted on the mounting bracket, the second rotator bracket is hingedly joined to the first rotator bracket, the third rotator bracket is mounted to at least a portion of the second rotator bracket and the fourth rotator bracket is hingedly joined to the third rotator bracket;

wherein the second rotator bracket is selectively positionable relative to the first rotator bracket in at least a first position and a second position;

wherein the fourth rotator bracket is selectively positionable relative to the third rotator bracket in at least a first position and a second position, the antenna mounting pole being operatively coupleable to the fourth rotator bracket and movable therewith;

wherein the selective positioning of the second rotator bracket and the fourth rotator bracket enable the antenna to be selectively movable in three dimensions;

wherein the first rotator bracket includes a base, the base having a top side and a bottom side disposed opposite the top side, and at least a first sidewall and a second sidewall;

wherein the first sidewall and the second sidewall extend outwardly and perpendicularly from the top side of the base of the first rotator bracket, the first sidewall and the second sidewall of the first rotator bracket being disposed opposite and parallel to each other and being separated from each other to define a space therebetween;

wherein the second rotator bracket includes a base, the base having a top side and a bottom side disposed opposite the top side, and at least a first sidewall and a second sidewall;

wherein the first sidewall and the second sidewall of the second rotator bracket extend outwardly and perpendicularly from the bottom side of the base of the second rotator bracket, the first sidewall and the second sidewall of the second rotator bracket being disposed opposite and parallel to each other and being separated from each other to define a space therebetween;

wherein either 1) the first and the second sidewalls of the second rotator bracket are at least partially received within the space between the first and second sidewalls of the first rotator bracket, or 2) the first and second sidewalls of the first rotator bracket are at least partially received within the space of the second rotator bracket;

wherein the third rotator bracket includes a base, the base having a top side and a bottom side disposed opposite the top side, and at least a first sidewall and a second sidewall;

wherein the first sidewall and the second sidewall of the third rotator bracket extend outwardly and perpendicularly from the top side of the base of the third rotator bracket, the first sidewall and the second sidewall of the third rotator bracket being disposed opposite and parallel to each other and being separated from each other to define a space therebetween;

wherein the bottom side of the base of the third rotator bracket is mounted at least partially on the first sidewall of the second rotator bracket;

wherein the fourth rotator bracket includes a base, the base having a top side and a bottom side disposed opposite the top side, and at least a first sidewall and a second sidewall; and wherein the first sidewall and the second sidewall of the fourth rotator bracket extend outwardly and perpendicularly from the top side of the base of the fourth rotator bracket, the first sidewall and the second sidewall of the fourth rotator bracket being disposed opposite and parallel to each other and being separated from each other to define a space therebetween; and wherein the first and the second sidewalls of the fourth rotator bracket are at least partially received within the space between the first and second sidewalls of the third rotator bracket.

2. The rotatable, multi-positionable antenna mount as defined by claim 1, wherein the mounting bracket comprises:
a base having a top surface and a bottom surface disposed opposite the top surface; and
at least a first sidewall and a second sidewall that extend outwardly and perpendicularly from the bottom surface of the base, the first sidewall and the second sidewall being disposed opposite and parallel to each other, the first sidewall and the second sidewall being separated from each other to define a space therebetween into which the supporting structure may be at least partially received.

3. The rotatable, multi-positionable antenna mount as defined by claim 2, wherein the mounting bracket further comprises:
at least one screw clamp adjuster, the screw clamp adjuster having a first axial end and a second axial end disposed opposite the first axial end;
wherein the screw clamp adjuster is reciprocatingly axially movable within the space between the first sidewall and the second sidewall of the mounting bracket; and
wherein the second axial end of the screw clamp adjuster is biased towards the structure by the axial movement of the screw clamp adjuster within the space between the first and second sidewalls of the mounting bracket.

4. The rotatable, multi-positionable antenna mount as defined by claim 3, wherein the mounting bracket further comprises:
at least one threaded bore that extends through the thickness of one of the first sidewall and the second sidewall of the mounting bracket and is in communication with the space therebetween;
wherein the screw clamp adjuster includes a threaded outer surface that extends along at least a portion of the axial length thereof;
wherein the screw clamp adjuster is received by the threaded bore and in threading engagement therewith; and
wherein rotation of the screw clamp adjuster causes axial movement of the second axial end thereof within the space between the first sidewall and the second sidewall of the mounting bracket.

5. The rotatable, multi-positionable antenna mount as defined by claim 4, wherein the screw clamp adjuster includes a handle for a user of the rotatable antenna mount to grasp to rotate the screw clamp adjuster and to effect axial movement of the second axial end thereof within the space between the first sidewall and the second sidewall of the mounting bracket.

6. The rotatable, multi-positionable antenna mount as defined by claim 3, wherein the mounting bracket further comprises:
at least one clamp pad, the at least one clamp pad being mounted to the second axial end of the screw clamp adjuster and being disposed in the space between the first sidewall and the second sidewall of the mounting bracket.

7. The rotatable, multi-positionable antenna mount as defined by claim 6, wherein the mounting bracket further comprises:

at least one gripping pad disposed in the space between the first sidewall and the second sidewall of the mounting bracket, the at least one gripping pad being affixed to at least one of the first sidewall, the second sidewall and the clamp pad.

8. The rotatable, multi-positionable antenna mount as defined by claim 2, wherein the mounting bracket further comprises:
at least one gripping pad disposed in the space between the first sidewall and the second sidewall of the mounting bracket, the at least one gripping pad being affixed to at least one of the first sidewall and second sidewall of the mounting bracket.

9. The rotatable, multi-positionable antenna mount as defined by claim 1, wherein the mounting bracket further comprises:
a first L-shaped bracket and a second L-shaped bracket, the first L-shaped bracket and the second L-shaped bracket being disposed opposite and parallel to each other, portions of the first L-shaped bracket and the second L-shaped bracket being separated from each other to define a space therebetween into which the supporting structure may be at least partially received;
wherein the first L-shaped bracket and the second L-shaped bracket are engageable with one another to define the mounting bracket.

10. The rotatable, multi-positionable antenna mount as defined by claim 2, wherein the mounting bracket further comprises:
at least one mounting post, the at least one mounting post extending generally perpendicularly outwardly from one of the first sidewall and the second sidewall of the mounting bracket;
wherein the antenna rotation assembly is mounted on the mounting post of the mounting bracket.

11. The rotatable, multi-positionable antenna mount as defined by claim 1, wherein the antenna rotation assembly further comprises:
a spring assembly, the spring assembly being disposed at least partially in the space between the first sidewall and the second sidewall of at least one of the first rotator bracket and the second rotator bracket; and
wherein the spring assembly biases the second rotator bracket in at least one direction toward at least one of the first position and the second position.

12. The rotatable, multi-positionable antenna mount as defined by claim 11, wherein the spring assembly further comprises:
a first spring and a second spring, each of the first spring and the second spring having a first axial end and a second axial end disposed opposite the first axial end;
wherein the first axial end of the first spring engages the first sidewall of the second rotator bracket and the second axial end of the first spring engages a first portion of the first rotator bracket; and
wherein the first axial end of the second spring engages the second sidewall of the second rotator bracket and the second axial end of the second spring engages a second portion of the first rotator bracket.

13. The rotatable, multi-positionable antenna mount as defined by claim 1, wherein each of the first sidewall and the second sidewall of the fourth rotator bracket includes a free end disposed opposite the base;
wherein the fourth rotator bracket includes a flange extending outwardly from each of the free ends;
wherein the antenna mount further includes a fifth rotator bracket, the fifth rotator bracket having a base, the base having a top side, a bottom side disposed opposite the top side, a first lateral edge and a second lateral edge disposed opposite the first lateral edge; and
wherein the fifth rotator bracket further includes at least one pair of prongs extending outwardly from the top side of the base, wherein the at least one pair of prongs includes a first prong and a second prong, the first prong and the second prong being disposed at opposite lateral edges of the base and extending parallel to each other, wherein each prong includes a free end disposed opposite the base, wherein each prong further includes a concave portion extending at least partially between the free end and the base of the fifth rotator bracket, and wherein the concave portions define a space therebetween for receiving the antenna mounting pole therein.

14. The rotatable, multi-positionable antenna mount as defined by claim 13, wherein the first rotator bracket further includes a third sidewall and a fourth sidewall, the third sidewall and the fourth sidewall of the first rotator bracket extending outwardly and perpendicularly from the top side of the base of the first rotator bracket, each of the third sidewall and the fourth sidewall including an outer surface, an inner surface disposed opposite the outer surface and at least one opening formed therethrough;
wherein each of the first sidewall and the second sidewall of the first rotator bracket includes an outer surface, an inner surface disposed opposite the outer surface and at least a first opening formed therethrough, the first opening in the first sidewall of the first rotator bracket being disposed opposite to the first opening in the second sidewall of the first rotator bracket;
wherein each of the first sidewall and the second sidewall of the second rotator bracket includes an outer surface, an inner surface disposed opposite the outer surface and at least a first opening and a second opening formed therethrough, the first opening in the first sidewall of the second rotator bracket being disposed opposite to the first opening in the second sidewall of the second rotator bracket;
wherein the antenna rotation assembly further comprises a spring assembly, the spring assembly being disposed at least partially in the space between the first sidewall and the second sidewall of at least one of the first rotator bracket and the second rotator bracket, the spring assembly including a first spring and a second spring, each of the first spring and the second spring having a first axial end, a second axial end disposed opposite the first axial end and a coiled portion therebetween, each coiled portion defining a central opening, wherein the first axial end of the first spring is at least partially received within the second opening in the first sidewall of the second rotator bracket and the second axial end of the first spring is received within the opening formed in the fourth sidewall of the first rotator bracket, wherein the first axial end of the second spring is at least partially received within the second opening in the second sidewall of the second rotator bracket and the second axial end of the second spring is at least partially received within the opening in the third sidewall of the first rotator bracket, wherein the central openings in the coiled portions of the first and second springs, the first openings in the first rotator bracket and the first openings in the second rotator bracket are aligned;
wherein the antenna rotation assembly further comprises at least a first rod, wherein the first rod is inserted through and received within the aligned first openings in the first rotator bracket and the second rotator bracket and the aligned central openings in the coiled portions of the first and second springs, wherein the first rod hingedly joins the first rotator bracket to the second rotator bracket; and wherein the spring assembly biases the second rotator bracket in at least one direction toward at least one of the first position and the second position.

15. The rotatable, multi-positionable antenna mount as defined by claim 14, wherein each of the first sidewall and the second sidewall of the third rotator bracket includes an outer surface, an inner surface disposed opposite the outer surface and at least a first opening formed therethrough, the first opening in the first sidewall being disposed opposite the first opening in the second sidewall;

wherein each of the first sidewall and the second sidewall of the fourth rotator bracket includes an outer surface, an inner surface disposed opposite the outer surface and at least a first opening formed therethrough, the first opening in the first sidewall being disposed opposite the first opening in the second sidewall; and wherein the antenna rotation assembly further comprises at least a second rod, wherein the second rod is inserted through and received within the first openings in the third rotator bracket and the fourth rotator bracket, wherein the second rod hingedly joins the fourth rotator bracket to the third rotator bracket.

\* \* \* \* \*